(12) United States Patent
Duncan

(10) Patent No.: US 8,001,613 B2
(45) Date of Patent: Aug. 16, 2011

(54) SECURITY USING PHYSICAL OBJECTS

(75) Inventor: Duncan, Camano Island, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 11/426,101

(22) Filed: Jun. 23, 2006

(65) Prior Publication Data

US 2007/0300307 A1    Dec. 27, 2007

(51) Int. Cl.
*G06F 21/24* (2006.01)
(52) U.S. Cl. .......... 726/28; 726/17; 726/19; 726/27
(58) Field of Classification Search .......... 345/173–178; 463/30, 31; 715/702, 733–743, 750–759; 726/16, 17, 20, 27, 28, 30; 455/41.1, 73; 717/105, 109
See application file for complete search history.

(56) References Cited

U.S. PATENT DOCUMENTS

| | | | |
|---|---|---|---|
| 4,817,176 A * | 3/1989 | Marshall et al. | 382/280 |
| 5,230,063 A | 7/1993 | Hoeber et al. | |
| 5,252,951 A | 10/1993 | Tannenbaum et al. | 345/156 |
| 5,345,549 A * | 9/1994 | Appel et al. | 715/741 |
| 5,423,554 A | 6/1995 | Davis | |
| 5,434,964 A | 7/1995 | Moss et al. | |
| 5,463,725 A | 10/1995 | Henckel et al. | 715/776 |
| 5,665,951 A | 9/1997 | Newman et al. | |
| 5,714,698 A | 2/1998 | Tokioka et al. | |
| 5,804,803 A | 9/1998 | Cragun et al. | |
| 5,818,450 A | 10/1998 | Katsuta | |
| 5,883,626 A | 3/1999 | Glaser et al. | |
| 5,910,653 A | 6/1999 | Campo | |
| 5,943,164 A | 8/1999 | Rao | |
| 6,159,100 A | 12/2000 | Smith | |
| 6,181,343 B1 | 1/2001 | Lyons | |

(Continued)

FOREIGN PATENT DOCUMENTS

WO    WO 0050979    8/2001

(Continued)

OTHER PUBLICATIONS

Shen et al., "DiamondSpin: An Extensible Toolkit for Around-the-Table Interaction", http://hci.stanford.edu/publications/2004/diamondspin/diamondspin.pdf, Apr. 2004, 8 pp.

(Continued)

*Primary Examiner* — Minh Dinh
*Assistant Examiner* — Shaun Gregory
(74) *Attorney, Agent, or Firm* — Merchant & Gould

(57) ABSTRACT

A password-type security system may be employed using the placement of physical objects as a security pattern that is to be matched before access to secured content is granted. The system may be implemented on a computing system that uses a display that can detect, e.g., via optical circuitry, the visual characteristics of the display surface. The system can visually detect the placement of objects, their orientations, locations, color, printed patterns, etc. The user may define a security pattern as comprising one or more objects placed at locations on the screen, or at a predetermined rotation angle. The outline shape of an object may be treated as a required pattern, such that access to secured content is permitted only if the object having that outline shape is detected on the display surface. Similarly, printed patterns on objects may also be detected and used as part of security patterns.

14 Claims, 7 Drawing Sheets

U.S. PATENT DOCUMENTS

| | | | |
|---|---|---|---|
| 6,240,207 B1 | 5/2001 | Shinozuka et al. | 382/187 |
| 6,247,128 B1 | 6/2001 | Fisher et al. | |
| 6,333,735 B1 | 12/2001 | Anvekar | |
| 6,414,672 B2 | 7/2002 | Rekimoto et al. | 345/173 |
| 6,445,364 B2 | 9/2002 | Zwern | |
| 6,448,964 B1 | 9/2002 | Isaacs et al. | |
| 6,452,593 B1 | 9/2002 | Challener | |
| 6,512,507 B1 | 1/2003 | Furihata | |
| 6,545,663 B1 | 4/2003 | Arbter et al. | |
| 6,568,596 B1 | 5/2003 | Shaw | |
| 6,577,330 B1 | 6/2003 | Tsuda et al. | |
| 6,593,945 B1 | 7/2003 | Nason et al. | |
| 6,624,833 B1 | 9/2003 | Kumar | |
| 6,630,943 B1 | 10/2003 | Nason et al. | |
| 6,662,365 B1 | 12/2003 | Sullivan et al. | |
| 6,667,741 B1 | 12/2003 | Kataoka et al. | |
| 6,672,961 B1 | 1/2004 | Uzun | |
| 6,686,931 B1 * | 2/2004 | Bodnar | 715/741 |
| 6,720,860 B1 * | 4/2004 | Narayanaswami | 340/5.54 |
| 6,735,625 B1 | 5/2004 | Ponna | |
| 6,745,234 B1 | 6/2004 | Philyaw et al. | |
| 6,767,287 B1 | 7/2004 | McQuaid et al. | |
| 6,768,419 B2 | 7/2004 | Garber et al. | |
| 6,791,530 B2 | 9/2004 | Vernier et al. | |
| 6,792,452 B1 | 9/2004 | Philyaw | |
| 6,822,635 B2 | 11/2004 | Shahoian et al. | |
| 6,847,856 B1 | 1/2005 | Bohannon | |
| 6,910,076 B2 | 6/2005 | Lortz | |
| 6,950,534 B2 | 9/2005 | Cohen et al. | |
| 6,965,842 B2 | 11/2005 | Rekimoto | |
| 6,990,660 B2 | 1/2006 | Moshir et al. | |
| 7,036,090 B1 | 4/2006 | Nguyen | |
| 7,085,590 B2 | 8/2006 | Kennedy et al. | |
| 7,098,891 B1 | 8/2006 | Pryor | |
| 7,104,891 B2 | 9/2006 | Osaka et al. | |
| 7,148,876 B2 | 12/2006 | Kawasome | |
| 7,259,747 B2 | 8/2007 | Bell | 345/156 |
| 7,327,376 B2 | 2/2008 | Shen et al. | |
| 7,397,464 B1 * | 7/2008 | Robbins et al. | 345/173 |
| 7,469,381 B2 | 12/2008 | Ording | |
| 7,483,015 B2 | 1/2009 | Sato | |
| 7,612,786 B2 | 11/2009 | Vale et al. | 345/619 |
| 2001/0012001 A1 | 8/2001 | Rekimoto et al. | 345/173 |
| 2001/0054082 A1 | 12/2001 | Rudolph et al. | |
| 2002/0109737 A1 | 8/2002 | Jaeger | |
| 2002/0151337 A1 | 10/2002 | Yamashita et al. | |
| 2002/0154214 A1 | 10/2002 | Scallie et al. | |
| 2002/0180811 A1 * | 12/2002 | Chu | 345/856 |
| 2003/0025676 A1 | 2/2003 | Cappendijk | |
| 2003/0063132 A1 | 4/2003 | Sauer et al. | |
| 2003/0119576 A1 | 6/2003 | McClintock et al. | |
| 2003/0234773 A1 | 12/2003 | Sano et al. | |
| 2004/0005920 A1 | 1/2004 | Soltys et al. | |
| 2004/0032409 A1 | 2/2004 | Girard | |
| 2004/0046784 A1 | 3/2004 | Shen | |
| 2004/0051733 A1 | 3/2004 | Katzir | |
| 2004/0090432 A1 | 5/2004 | Takahashi et al. | |
| 2004/0119746 A1 * | 6/2004 | Mizrah | 345/763 |
| 2004/0127272 A1 | 7/2004 | Park et al. | |
| 2004/0141008 A1 | 7/2004 | Jarczyk et al. | |
| 2004/0212617 A1 | 10/2004 | Fitzmaurice | |
| 2005/0054392 A1 | 3/2005 | Too | |
| 2005/0069186 A1 | 3/2005 | Rubbert et al. | |
| 2005/0110781 A1 | 5/2005 | Geaghan et al. | |
| 2005/0122308 A1 | 6/2005 | Bell et al. | |
| 2005/0134578 A1 | 6/2005 | Chambers et al. | |
| 2005/0146508 A1 | 7/2005 | Kirkland et al. | |
| 2005/0153128 A1 | 7/2005 | Selinfreund et al. | |
| 2005/0162402 A1 | 7/2005 | Watanachote | |
| 2005/0166264 A1 | 7/2005 | Yamada et al. | |
| 2005/0177054 A1 | 8/2005 | Yi et al. | |
| 2005/0183035 A1 | 8/2005 | Ringel | |
| 2005/0193120 A1 | 9/2005 | Taylor | |
| 2005/0200291 A1 | 9/2005 | Naugler et al. | |
| 2005/0248729 A1 | 11/2005 | Drucker et al. | |
| 2005/0251800 A1 * | 11/2005 | Kurlander et al. | 717/174 |
| 2005/0253872 A1 | 11/2005 | Goss et al. | |
| 2005/0275622 A1 * | 12/2005 | Patel et al. | 345/156 |
| 2005/0277071 A1 | 12/2005 | Yee | |
| 2005/0280631 A1 | 12/2005 | Wong et al. | |
| 2006/0015501 A1 * | 1/2006 | Sanamrad et al. | 707/9 |
| 2006/0017709 A1 | 1/2006 | Okano | |
| 2006/0026535 A1 | 2/2006 | Hotelling et al. | |
| 2006/0075250 A1 | 4/2006 | Liao | |
| 2006/0077211 A1 | 4/2006 | Zhou | |
| 2006/0090078 A1 * | 4/2006 | Blythe et al. | 713/185 |
| 2006/0119541 A1 * | 6/2006 | Blythe et al. | 345/31 |
| 2006/0156249 A1 | 7/2006 | Blythe et al. | |
| 2006/0161871 A1 | 7/2006 | Hotelling et al. | |
| 2006/0244719 A1 | 11/2006 | Brigham et al. | |
| 2006/0244734 A1 | 11/2006 | Hill et al. | |
| 2007/0063981 A1 | 3/2007 | Galyean et al. | |
| 2007/0188518 A1 | 8/2007 | Vale et al. | |
| 2007/0220444 A1 | 9/2007 | Sunday et al. | |
| 2007/0236485 A1 | 10/2007 | Trepte | |
| 2007/0284429 A1 | 12/2007 | Beeman | |
| 2007/0300182 A1 | 12/2007 | Bilow | |
| 2008/0040692 A1 | 2/2008 | Sunday et al. | |
| 2008/0192005 A1 | 8/2008 | Elgoyhen et al. | 345/158 |

FOREIGN PATENT DOCUMENTS

| | | |
|---|---|---|
| WO | WO 0236225 | 5/2002 |
| WO | WO 2005040944 | 5/2005 |
| WO | 2005122557 | 12/2005 |
| WO | WO 2006003586 | 1/2006 |

OTHER PUBLICATIONS

Wilson, "PlayAnywhere: A Compact Interactive Tabletop Projection-Vision System", http://research.microsoft.com/~awilson/papers/Wilson%20PlayAnywhere%20UIST%202005.pdf, Oct. 2005, 10 pp.

Logitech, "SecureConnect: A Major Leap in the Cordless Desktop Experience", http://www.logitech.com/pub/pdf/bluetooth/secure_connect_whitepaper.pdf, received Apr. 7, 2006, 5 pp.

Elzabadani et al., "Self-Sensing Spaces: Smart Plugs for Smart Environments", http://www.icta.ufl.edu/projects/publications/2005-ICOST-Selfsensingspaces.pdf, received Apr. 7, 2006, 8 pp.

Symantec, "Symantec Discovery: Track hardware/software assets and monitor license compliance throughout a multiplatform IT infrastructure", http://eval.veritas.com/mktginfo/enterprise/fact_sheets/ent-factsheet_discovery_12-2005.en-us.pdf, Dec. 2005, 5 pp.

Stoakley et al., "Virtual Reality on a WIM: Interactive Worlds in Miniature", Conference on Human factors in Computer Systems, Proceedings of the SIGCHI Conference on Human Factors in Computing Systems, ACM Press/Addison-Wesley Publishing Co., http://delivery.acm.org/10.1145/230000/223938/p265-stoakley.html?key1=223938&key2=5808034411&coll=GUIDE&dl=GUIDE&CFID=73042672&CFTOKEN=344092262, 1995, 14 pp.

Nikitin et al., "Real-Time Simulation of Elastic Objects in Virtual Environments Using Finite Element Method and Precomputed Green's Functions", Eighth Eurographics Workshop on Virtual Environments, 2002, 6 pp.

TouchTable™, Northrop Grumman, www.northropgrumman.com, 2005, 2 pp.

TouchTable™, Northrop Grumman, http://www.ms.northropgrumman.com/touchtable.index.html, 2006, 2 pp.

U.S. Official Action mailed Mar. 3, 2008 in U.S. Appl. No. 11/278,264.

U.S. Official Action mailed May 30, 2008 in U.S. Appl. No. 11/425,843.

U.S. Official Action mailed Jul. 9, 2008 in U.S. Appl. No. 11/378,267.

U.S. Official Action mailed Jul. 10, 2008 in U.S. Appl. No. 11/423,883.

U.S. Official Action mailed Oct. 7, 2008 in U.S. Appl. No. 11/350,853.

U.S. Official Action mailed Dec. 2, 2008 in U.S. Appl. No. 11/278,264.

U.S. Official Action mailed Jan. 12, 2009 cited in U.S. Appl. No. 11/378,267.

U.S. Official Action mailed Jan. 23, 2009 cited in U.S. Appl. No. 11/423,883.

U.S. Official Action mailed Apr. 14, 2009, in U.S. Appl. No. 11/278,264.

U.S. Official Action mailed Oct. 5, 2009, in U.S. Appl. No. 11/378,267.

U.S. Official Action mailed Nov. 12, 2009 in U.S. Appl. No. 11/278,264.

Microsoft® Paint Version 5.1 Screenshots, Microsoft Corporation, 2007, 2 pp.

U.S. Official Action mailed Mar. 5, 2010 in U.S. Appl. No. 11/378,267.

U.S. Official Action mailed May 12, 2010 in U.S. Appl. No. 11/278,264.

U.S. Official Action mailed Oct. 6, 2010 in U.S. Appl. No. 11/427,684.

U.S. Official Action mailed Oct. 27, 2010 in U.S. Appl. No. 11/278,264.

Hiroshi Sasaki et al., "Hands-Free User Interface for Seamless Collaborative Works in Shared MR Space", 6 pages, date unknown (3rd CREST/ISWC Workshop on Advanced Computing and Communicating Techniques for Wearable Information Playing, pp. 84-89 (Oct. 31, 2004)).

Krishna et al., "23.3: Tactile Sensor Based on Piezoelectric Resonance", 2002 IEEE, pp. 1643-1647.

http://www.softsland.com/Natural_Login_Pro.html, Apr. 13, 2006, 3 pages.

U.S. Official Action mailed Apr. 20, 2011 in U.S. Appl. No. 11/427,684.

* cited by examiner

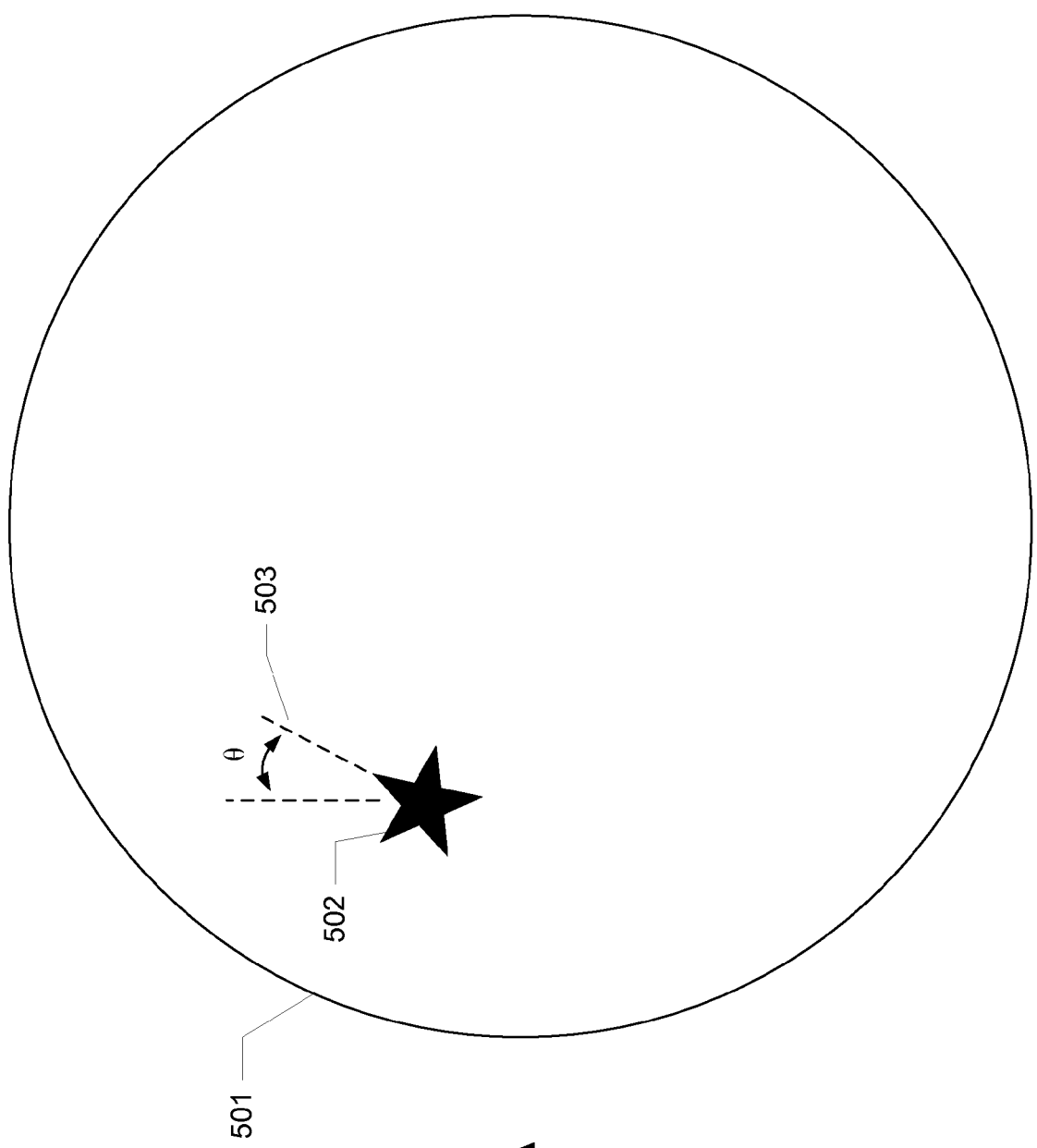

SECURITY USING PHYSICAL OBJECTS

BACKGROUND

Passwords have become ubiquitous in daily life. Today, it is not uncommon for a person to have to remember dozens of unique words, codes, numbers and phrases to gain access to bank automated teller machines (ATMs), subscription Internet sites, work computers, e-mail programs, cell phone accounts, cable television pay-per-view (and other television parental control features), and a plethora of other secure locations. Many times, these passwords are randomly-generated sequences of letters and numbers that may enhance security, but may also be difficult to remember. Couple that with the equally random account numbers that often go with these services, and it is easy to see why many have resorted to using the same password at different locations, or writing passwords down on a handy piece of paper by the computer. Obviously, such efforts compromise security, undermining the purpose for their existence in the first place.

As technology marches onward, new genres of products offer opportunities for doing things differently. One such technology offers video displays that can see, or optically detect, objects that are placed against or near the display surface. The description below offers password security features that may take advantage of the capabilities of these kinds of displays.

SUMMARY

This Summary is provided to introduce a selection of concepts in a simplified form that are further described below in the Detailed Description. This Summary is not intended to identify key features, essential features, or required advantages of the claimed subject matter, or in limiting the scope of the appended claims.

Methods are described herein that allow users to define security levels in a computing system that uses the shape and/or layout arrangement of one or more physical objects. Accessing secured content may require the placement of physical objects against a display surface that can detect the objects. The user can request to define any security pattern they wish, and the system may respond by asking the user to place the desired object or objects in the desired pattern on the display. The system may then detect the various visual attributes of the placed object(s), such as their outline shape, position on the display, relative positioning with respect to other objects, rotation orientation, interior design pattern, etc., and may ask the user to select which ones will be used in the security pattern.

The display surface may be a table top configuration, which may be used as a desk, so it may contain other objects not necessarily intended by the user to be security pattern objects. The system, when defining a security pattern, may give the user the option of de-selecting certain objects so that they are ignored in the pattern being created.

When configuring the security pattern, the system may display an attribute menu adjacent to each detected object on the display. The menu can list the various detected attributes, and may give the user the option to check/un-check the individual attributes to allow the user to customize the level of security desired. For example, a user might simply wish to use the object's outline shape for one security pattern, and may wish to use the outline shapes and rotational orientations of a group of objects for another security pattern.

For the attributes that are to be used, the system may also allow the user to define a margin of error for the application of the security pattern. Accordingly, if the security pattern requires that an object having a particular shape be placed at a particular location on the display, the system may be configured to accept placements of the object in slightly different locations (e.g., 5% to the left or right, 10% above, etc.).

Users may find it easier to remember a physical object-based security pattern, and having a physical object associated with the security pattern may allow users to easily recognize how secure (or unsecure) their content is, both of which may give the user greater confidence in the system. A user might not readily understand the difference in security between a five-letter alphanumeric password and a ten-letter one, but the user may easily understand the relative difference between requiring the placement and/or arrangement of five objects versus ten. Additionally, since a physical object cannot be duplicated as easily as an alphanumeric password, a user who temporarily loses the object (e.g., to a child who sneaks the object from a mother's purse) can rest assured that when the object is returned, the security is restored (without having to create a new security pattern). These advantages and others may be realized using some or all of the features described herein.

These and other features will be described in greater detail below.

BRIEF DESCRIPTION OF THE DRAWINGS

FIGS. 5A and 5B illustrate example displays having one or more objects placed on top or against them as a security pattern.

DETAILED DESCRIPTION

Figure 1:
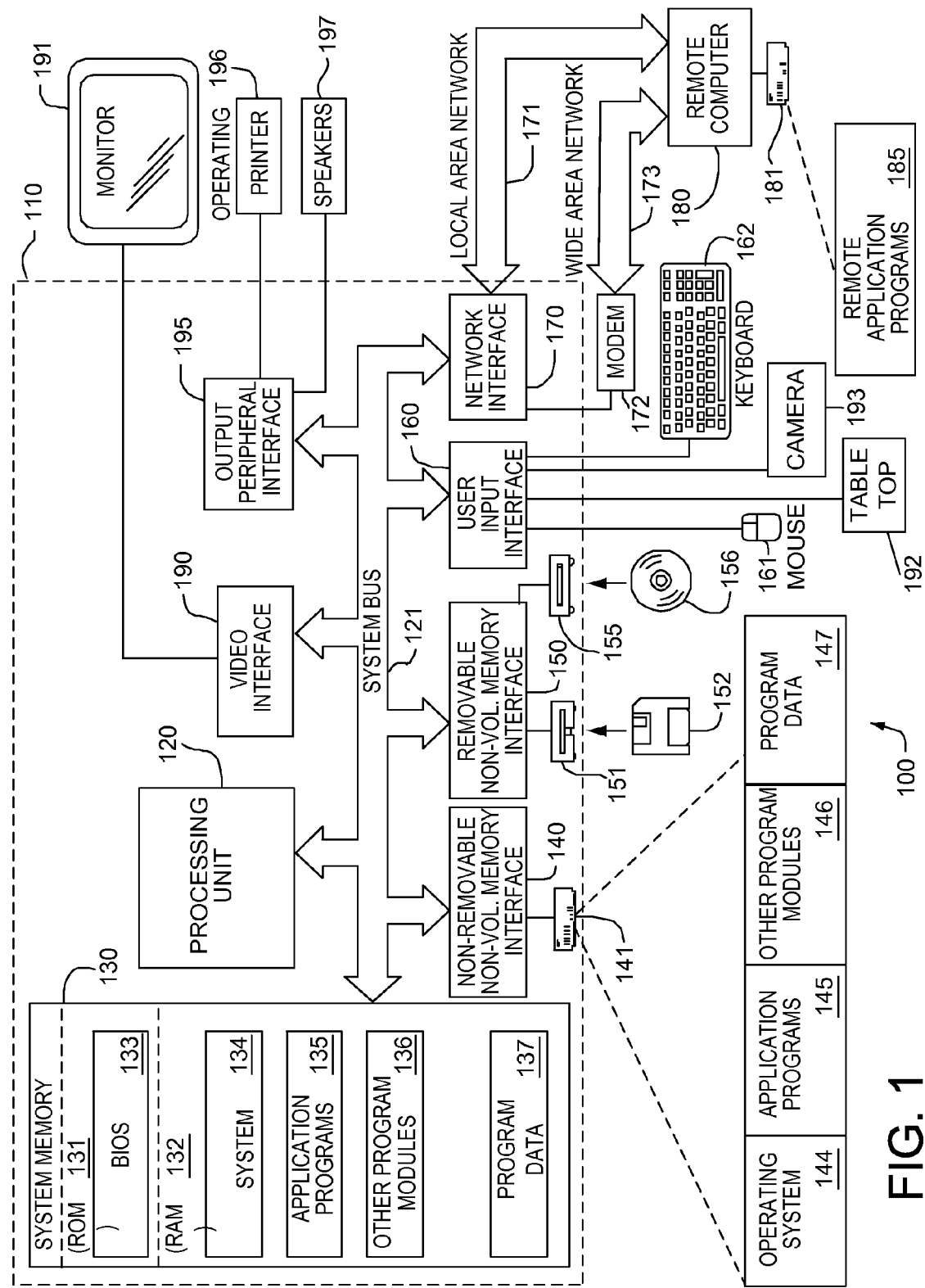
FIG. 1 illustrates an example computing environment in which features described herein may be implemented.

FIG. 1 illustrates an example of a suitable computing system environment 100 on which the features herein may be implemented. The computing system environment 100 is only one example of a suitable computing environment and is not intended to suggest any limitation as to the scope of use or functionality of the features described herein. Neither should the computing environment 100 be interpreted as having any dependency or requirement relating to any one or combination of components illustrated in the exemplary operating environment 100.

The features herein are described in the general context of computer-executable instructions, such as program modules, being executed by a computer. Generally, program modules include routines, programs, objects, components, data structures, etc. that can perform particular tasks or implement particular abstract data types. Moreover, those skilled in the art will appreciate that the features may be practiced with other computer system configurations, including hand-held devices, multiprocessor systems, microprocessor-based or programmable consumer electronics, minicomputers, mainframe computers, and the like. The features may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing features described herein includes a general purpose-computing device in the form of a computer 110 including a processing unit 120, a system memory 130, and a system bus 121 that couples various system components including the system memory to the processing unit 120.

Computer 110 may include a variety of computer readable media. By way of example, and not limitation, computer readable media may include computer storage media and communication media. The system memory 130 may include computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, may be stored in ROM 131. RAM 132 may contain data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 1 may provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. The video interface 190 may be bidirectional, and may receive video input from sensors associated with the monitor 191. For example, the monitor 191 may be touch and/or proximity sensitive, such that contacts to a monitor surface may be used as input data. The input sensors for affecting this could be a capacitive touch sensitive device, an array of resistive contact sensors, an optical sensor or camera, or any other desired sensor to make the monitor 191 touch and/or proximity sensitive. The monitor itself may be optically sensitive, such as the example shown in FIG. 2 and described below. In an alternative arrangement, or in addition, a touch, optical and/or proximity sensitive input system may be separate from monitor 191, and may include a planar surface such as a table top 192 and any applicable sensing systems to make the planar surface touch sensitive, such as camera 193. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Many of the features described herein may be implemented using computer-executable instructions stored on one or more computer-readable media, such as the media described above, for execution on the one or more units that make up processing unit 120.

Figure 2:
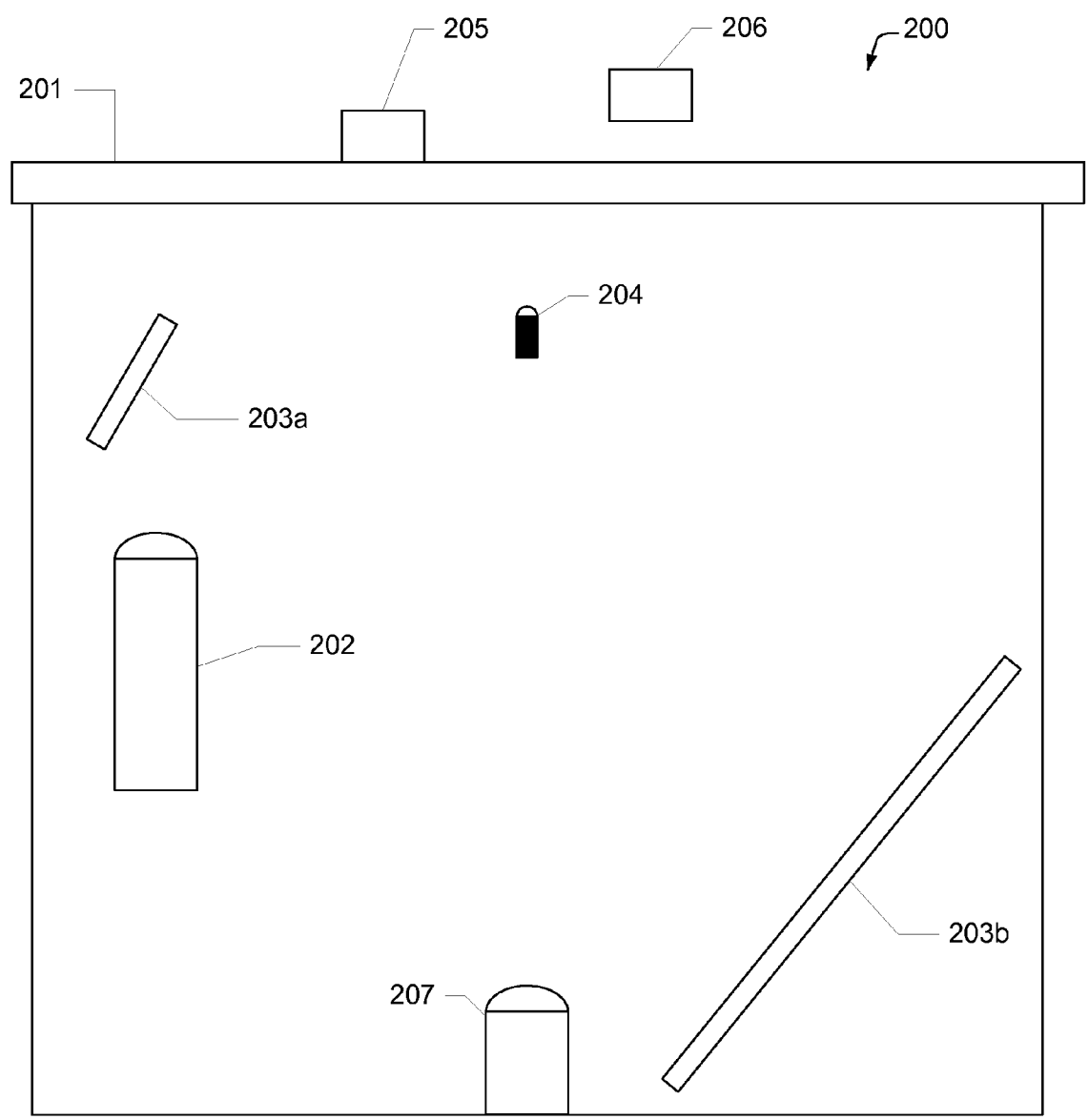
FIG. 2 illustrates an example optical detection system that may be used as a display to implement features described herein.

The computing device shown in FIG. 1 may be incorporated into a system having table display device 200, as shown in FIG. 2. The display device 200 may include a display surface 201, which may be a planar surface such as the table top 192. As described hereinafter, the display surface 201 may also help to serve as a user interface.

The display device 200 may display a computer-generated image on its display surface 201, which allows the device 200 to be used as a display monitor (such as monitor 191) for computing processes, displaying graphical user interfaces, displaying television or other visual images, video games, and the like. The display may be projection-based, and may use a digital light processing (e.g., DLP by Texas Instruments, Inc., Plano, Tex.) technique, or it may be based on other display technologies, such as liquid crystal display (LCD) technology. Where a projection-style display is used, a projector 202 may be used to project light onto the underside of the display surface 201. It may do so directly, or may do so using one or more mirrors. As shown in FIG. 2, the projector 202 in this example projects light for a desired image onto a first reflective surface 203*a*, which may in turn reflect light onto a second reflective surface 203*b*, which may ultimately reflect that light onto the underside of the display surface 201, causing the surface 201 to emit light corresponding to the desired display.

In addition to being used as an output display for displaying images, the device 200 may also be used as an input-receiving device. As illustrated in FIG. 2, the device 200 may include one or more light emitting devices 204, such as IR light emitting diodes (LEDs), mounted in the device's interior. The light from devices 204 may be projected upwards through the display surface 201, and may reflect off of various objects that are above the display surface 201. For example, one or more objects 205 may be placed in physical contact with the display surface 201. One or more other objects 206 may be placed near the display surface 201, but not in physical contact (e.g., closely hovering). The light emitted from the emitting device(s) 204 may reflect off of these objects, and may be detected by a camera 207, which may be an IR camera if IR light is used. The signals from the camera 207 may then be forwarded to a computing device (e.g., the computer 110 shown in FIG. 1) for processing, which, based on various configurations for various applications, may identify the object and its orientation (e.g. touching or hovering, tilted, partially touching, etc.) based on its shape and the amount/type of light reflected. To assist in identifying the objects 205, 206, the objects may include a reflective pattern, such as a bar code, on their lower surface. To assist in differentiating objects in contact 205 from hovering objects 206, the display surface 201 may include a translucent layer that diffuses emitted light. Based on the amount of light reflected back to the camera 207 through this layer, the associated processing system may determine whether an object is touching the surface 201, and if the object is not touching, a distance between the object and the surface 201. Accordingly, various physical objects (e.g., fingers, elbows, hands, stylus pens, blocks, etc.) may be used as physical control members, providing input to the device 200 (or to an associated computing device).

The device 200 shown in FIG. 2 is illustrated as using light projection- and sensing techniques for the display of data and the reception of input, but other techniques may be used as well. For example, stylus-sensitive displays are currently available for use with Tablet-based laptop computers, and such displays may be used as device 200. Additionally, stylus- and other touch-sensitive displays are available with many personal data assistants (PDAs), and those types of displays may also be used as device 200.

The device 200 is also shown in a substantially horizontal orientation, with the display surface 201 acting as a tabletop. Other orientations may also be used. For example, the device 200 may be oriented to project a display onto any desired surface, such as a vertical wall. Reflective IR light may also be received from any such oriented surface.

Figure 4:
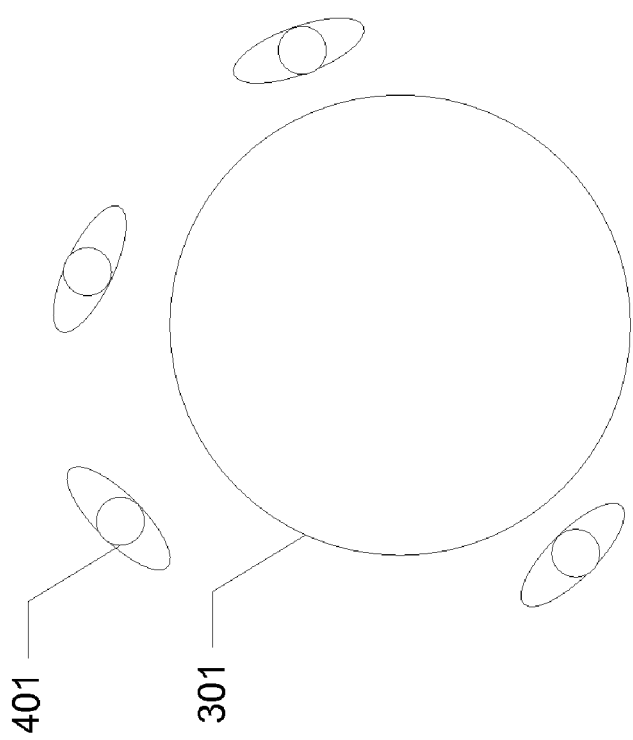
FIGS. 3 and 4 illustrate example table embodiments of the display shown in FIG. 2.
Figure 3:
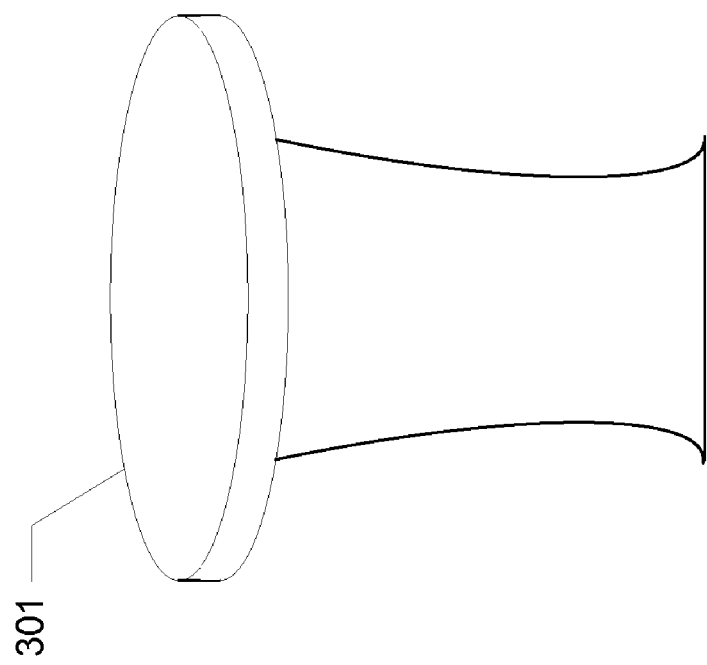

FIG. 3 illustrates an illustrative configuration of an implementation of the system shown in FIG. 2, in which device 301 is used as a tabletop display device. FIG. 4 illustrates an overhead view of such a table, around which a number of users 401 may be seated or standing. Each user 401 may wish to interact with the display on the surface of table 301, for example to place and/or touch an object, or to play a party video game. Although the display area of table 301 shown in this example is circular, it may be any desired shape, such as oval, rectangular, square, hexagon, octagon, etc.

FIG. 5A illustrates an example of a security pattern that may be used in the place of, or together with, alphanumeric passwords to restrict access to a location or content on a computing system. The display 501 may be in a tabletop or horizontal configuration, and may have several objects resting on top (other configurations may also be used, with objects in contact with the display surface). FIG. 5A shows the placement of a star-shaped object 502 on the display 501. The object may be a personal effect of the user, such as a keychain ornament, that the user can easily remember to place on the tabletop display whenever he/she needs to access some particular piece of secured content (e.g., parental control blocking predetermined program types, such as adult content, from programs viewed on a television or the display 501 itself). The display 501 may detect the outline shape of the object 502, and may require that it sees the object 502 somewhere on the display 501 before granting access to the restricted content. For added security, the user may configure the display 501 (or the secured content) to require more than just the placement of the object 502 having the appropriate outline. For example, the user may configure the system to require that the object be placed at a predefined location on the display 501 surface, using for example X,Y pixel coordinates. The user may also configure the system to require that the object 502 be placed at a particular angle 503 of rotation orientation from a normal orientation. These options are described further below.

Figure 5B:
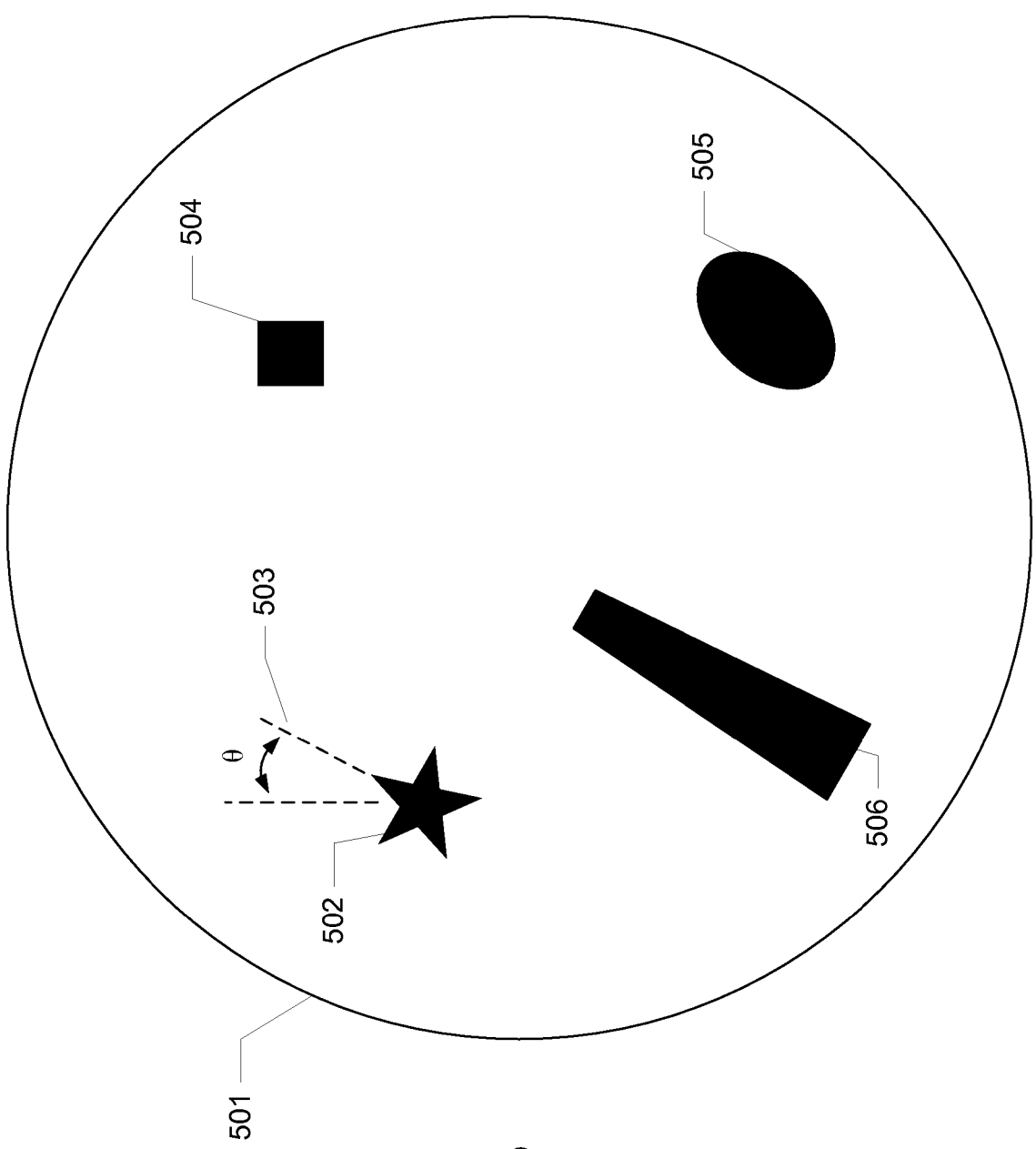

The user may also configure the system to require the placement of more than one object. FIG. 5B illustrates an example in which four example objects are placed on the display 501 as a security pattern. In the FIG. 5B example, the security pattern involves one or more dice 504, a trophy having an oval base 505, and a stapler 506 all placed on the display 501 before being satisfied and granting access to the secured content. As with the keychain 502, these objects may also be required to be placed at the proper locations, orientations, and/or at the proper angles, before access will be granted to the secured content.

Figure 6:
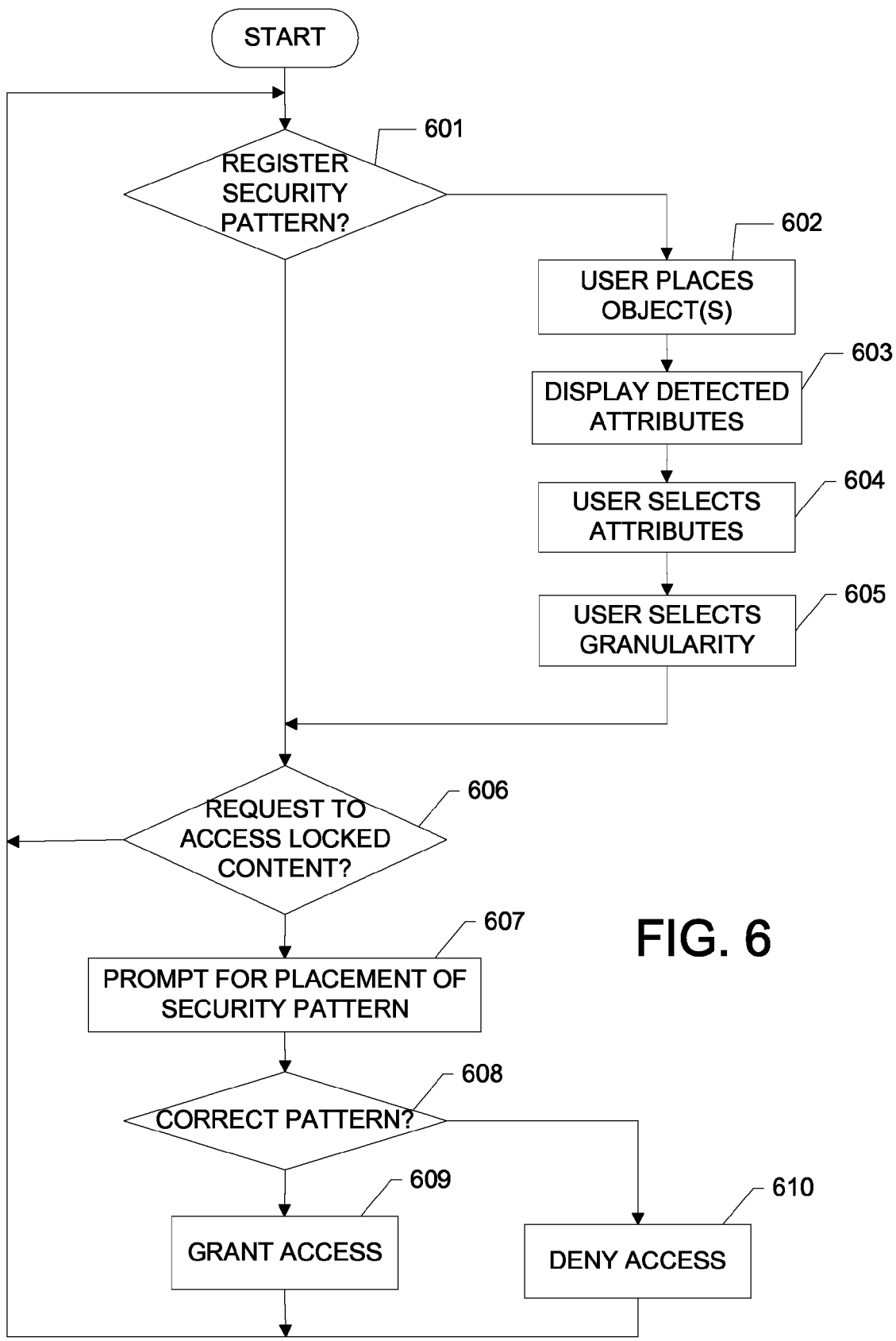
FIG. 6 illustrates an example process employing various features described herein.

FIG. 6 illustrates a process by which a security pattern may be defined and used. In step 601, the system (e.g., display 501 and/or its underlying computing system) may check to see if a request has been made to register a new security pattern to restrict access to some content (e.g., a television program, a software application, a data file, etc.). The request may be generated in many ways. It may be generated in response to a user's request, for example, to set a parental control limit on a television program source, or to change the security pattern for a previously-secure application or piece of content. Alternatively, the request may be generated automatically, such as when a security-enabled application program is first installed on the display 501's computing system, or when a periodic update is scheduled. The request may also identify the target that is to be locked by the security pattern. The secured content can be any aspect of the system, such as application software, configuration settings, data files, Internet sites, television programs, radio channels, etc.

If a request has been received, the process may move to step 602 and await the user's placement of objects on the display 501. The system may prompt the user with a pop-up display or other message requesting that the user place the proposed security pattern objects on the display. Step 602 may occur prior to, or simultaneously with, the request in step 601.

Figure 7:
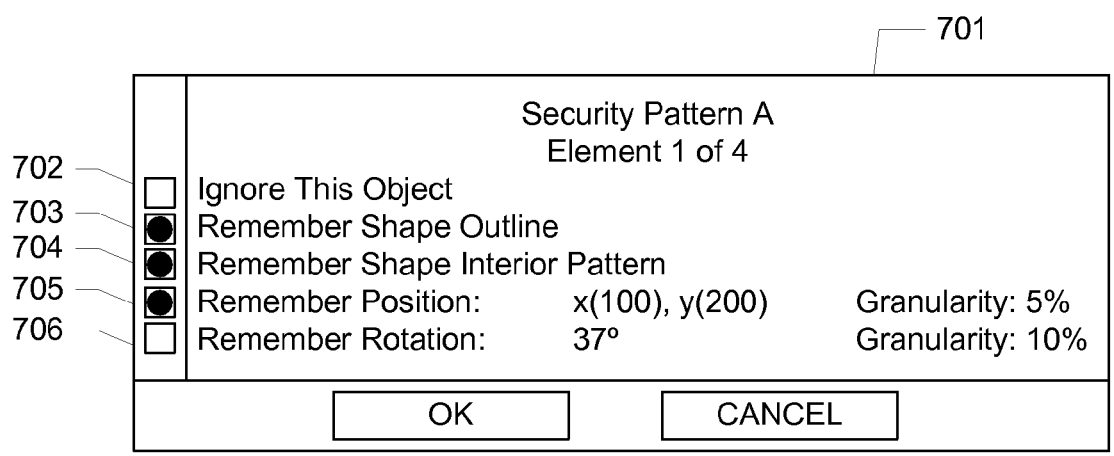
FIG. 7 illustrates an example attribute menu that may be displayed for proposed security pattern objects.

When the proposed security pattern objects are placed on the display, the system proceeds to step 603 and scans to determine what objects are seen or detected on the display. During this process, the system may trace the outlines of the objects detected on the display, and may measure and record placement and orientation data identifying various aspects (e.g., appearance, outline, location, rotation, etc. described below) of how the objects were arranged. The system may display an attribute menu 701 (as illustrated in FIG. 7) for each detected object. The present discussion will digress briefly to discuss the attribute menu in greater detail.

A separate attribute menu 701 may be displayed adjacent to each object detected on the display surface in step 602. The attribute menu 701 may display a number of object characteristics that have been detected by the system and may be selected for inclusion in the security pattern being generated, as well as the option to have certain detected objects ignored or excluded from the security pattern being defined. For example, the user may be given an option to de-select a particular object, to indicate that a detected object is not intended to be part of the security pattern. This may be useful, for example, if the user has other miscellaneous objects on the display surface and does not wish to clear off the entire surface to generate the pattern. This may also be useful if inadvertent objects, such as the user's elbow, were placed on the display and detected in step 602.

For objects that the user wishes to include in the security pattern, the user may have an option 703 to indicate that the object's outline shape is an attribute to be used in the security pattern. This may be useful, for example, if the user has a particular object (e.g., the star-shaped keychain ornament 502) that he/she intends to treat as the "key" to the secured content. If this option is selected (e.g., by checking a selection box), then when the security pattern is in use, it will require the presence, somewhere on the display, of the object's outline before granting access to the secured content.

Figure 8:
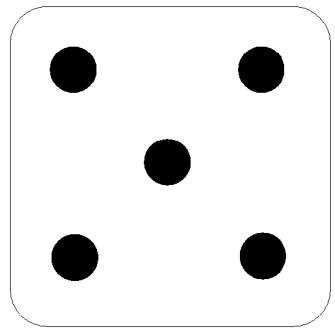
FIGS. 8 and 9 illustrate example interior patterns that may be used as part of a security pattern.
Figure 9:
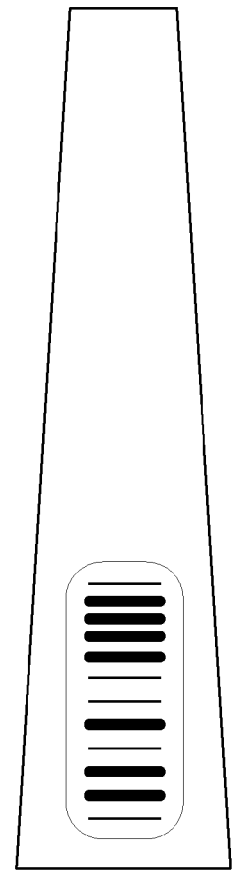

As another option 704, the user may request that the object's interior pattern also be a required attribute of the security pattern. The display may detect visual patterns on the bottom surface of objects resting on the display, and may incorporate those patterns in the security pattern when this option is selected. So, for example, if object 504 is a die, then the pattern shown in FIG. 8 may be the detected interior pattern. If this interior pattern is included in the security pattern, then the secured content will only be unlocked if the object having this pattern (in the FIG. 8 example, the number '5' on the die) is placed on the display surface. The interior pattern may be any printed pattern or surface feature. FIG. 9 shows an example of a bar code that may be affixed to (or carved in) the bottom of stapler 506 and detected. The pattern may be printed using visible ink, or any other form of ink (e.g., invisible to humans) that can be detected by the display system's camera 207.

As another option 705, the user may request that the current position of the object be used as a required attribute of the security pattern. The location may be expressed in terms of X,Y display (e.g., pixel) coordinates, or any other desired coordinate system. This requirement will require the placement of an object at the specified location, but will not necessarily require the same object used in defining the security pattern. For example, if the security pattern only includes object position 705 criteria, without other object-specific criteria such as shape outline 703 and shape interior pattern 704, the placement of any object at the specified location may serve to satisfy the security pattern. This may be useful, for example, if the user does not want to have to remember to bring specific objects to the display to unlock secured content. Instead, the user might simply want to remember that unlocking that content requires placing, for example, any object in the upper-left corner of the display, or placing multiple objects in the shape of a square at some location on the display.

The options may also include a granularity option. The granularity option may specify a margin for error permitted in unlocking the secured content. So, for example, if the object's position 705 is a required part of the security pattern, the user may specify a 5% margin of error that will also satisfy the requirement. In such a case, if the user attempts to unlock content locked by a security pattern that requires placing an object at location 100, 100, but places the object 5% off of the required location (e.g., at coordinates 95, 100; or 95, 95), the system may still treat that as satisfying the requirement. Some programs may automatically include a degree of granularity in some or all of the security pattern's requirements, to allow users some flexibility in use. Some programs may place limitations on the ranges of granularity permitted, such as a guaranteed minimum margin for error to prevent users from requiring too high a degree of precision, or a granularity ceiling to avoid giving so much margin for error that the attribute loses value as a security measure.

Another option 706 may specify the rotational orientation angle made by the object. Some objects may have a normal, vertical axis, based on their shape, and the rotational angle may indicate how much the object has been rotated away from its normal axis. For example, the star keychain 502 may be defined as upright with one point pointing straight up, and its arrangement in FIGS. 5A and 5B is considered to be rotated by an angle 503-θ. The normal axis may be predetermined as part of shape recognition software used in the system, or the user may define the object's normal axis in a configuration process (e.g., by placing the object on the display and identifying the normal axis by touching two points to define the axis, or by touching a point outside the object through which the normal axis passes if the center of the object is otherwise specified). The rotational offset is also subject to a granularity option to allow for angular imperfections when the pattern is in use. These are example visual attributes that may be used, and other aspects of an object may be required as well. For example, some implementations may require specific colors, reflectivity/light scattering, patterns of movement or placement in multiple locations and/or orientations over a period of time, radio-frequency identifiers, etc. to be present in an object to satisfy a security pattern requirement.

Returning now to the process of FIG. 6, in step 604, the user selects the desired attribute(s) that will be requirements in the security pattern being defined (e.g., by checking selection boxes in the various attribute menus 701), and in step 605, the user may define granularities for the various attributes.

The process may then move to step 606 to determine if a request has been made to unlock content that is secured by a security pattern. The request may be made in any way desired. For example, if the security pattern is registered as restricting a particular video program (e.g., adult video content), the request may be made when a user operates a remote control (e.g., a handheld remote, or using a remote control graphical user interface on display 501) to select the restricted content. The request may also occur automatically, for example, if a user had previously scheduled a program to be recorded before the program was locked by another user, but the program had become locked by the time it was scheduled to air.

If no request is made, the process may return to step 601 to begin anew. If a request is made to access locked content, the process may proceed to step 607, where the user attempting to access the content is prompted to present the required security pattern. The system may continuously scan the display surface and determine whether the required pattern is present, or alternatively, it may simply ask the user to indicate (e.g., by pressing a "Ready" button displayed with the prompt) when he/she is finished arranging objects to present as the security pattern. In some instances, one or more of the required objects may already have been on the display surface, and might only need to be moved to the correct location after the request in order to satisfy the security pattern. For example, if the user is using the display 501 as a desk, he/she may already have objects like coffee mugs, staplers, telephones, computers, pen holders, etc. lying about on the display surface. Some of these may have been designated security objects, and the user might configure a security pattern to simply require moving one of these objects to its proper location after the request to unlock the secured content.

Once the objects are in place, in step 608, the system may scan the display surface to determine whether the required security pattern is present. During this process, the system may simply ignore those objects that do not satisfy any part of the security pattern, looking just for the required attributes. This may allow the user to avoid having to clear off the entire surface of the display 501 in order to present the pattern. Alternatively, the security pattern may be configured to require just that—that only the objects specified by the pattern are placed on the display 501 during the pattern verification process. In some situations, applications may define a subset area of the display 501 that must be cleared of extraneous objects and only contain the security pattern objects (i.e., all objects detected in the subset area during verification are compared to the security pattern, and objects that do not satisfy an attribute of the security pattern cause the verification to fail).

If the security pattern is present, the system may grant the requested access in step 609. If the security pattern is not present, the system may deny access in step 610. The security pattern process may then return to step 601 to begin anew. Note that the security pattern process may be used in conjunction with traditional alphanumeric passwords, if desired, to provide a higher degree of security.

The security pattern may be stored as a data structure in any of the computer-readable media and storage devices described above. For example, the security pattern may be stored as a file having the contents shown below:

```
<Security Pattern Name>
<Security Pattern Target>
<Number of Objects>
Object 1:
    <Shape Outline ID>
Object 2:
    <Shape Outline ID>
    <Shape Position>
Object 3:
    <Shape Interior Pattern>
    <Shape Position>
    <Shape Rotation>
```

The <Security Pattern Name> parameter may be an alphanumeric name given by the user when defining the security pattern. The <Security Pattern Target> may be an identifier of the television program, television channel, Internet site, software application, data file, or other content whose access will require that the user correctly provide the security pattern. The security pattern is not limited to locking just one piece of content, and may instead be used to lock a variety of different pieces of content (e.g., multiple files, applications, programs, etc.).

The <Number of Objects> parameter may identify a number of objects that will need to be presented to satisfy the security pattern. For each object, the security pattern file may identify one or more attributes associated with the object. So, for example, Object 1 might only require that a particular item be placed somewhere on the display, and may list a single <Shape Outline ID> attribute. The <Shape Outline ID> attribute may identify (e.g., a file pointer, file name, etc.) a source from which the outline of the required shape may be obtained. This may be an image file, such as a *.BMP, *.JPG, *.PDF, etc., and may be generated using a computer assisted drawing (CAD) program, such as MICROSOFT VISIO™ (product of Microsoft Corporation, Redmond Wash.).

Other parameters may be stored as well. For example, Object 2 might also include a <Shape Position> attribute. This attribute may identify one or more pixel coordinates (e.g., 100, 200) on the display that are required to be occupied by the given object, as well as any granularity tolerances (e.g., 5%, 10%, etc.) specified by the user. If multiple objects are included in the security pattern, the position attribute may refer to relative positions among the objects, as opposed to fixed coordinates on the display. For example, the security pattern may indicate that three objects form the vertices of an equilateral triangle, with no requirement of how large or small the triangle must be. So long as the three objects maintain the correct relative position with one another, they may satisfy such an attribute.

Other objects, such as Object 3, may include a <Shape Interior Pattern> attribute that may identify the source of a pattern image (akin to the image file identified above) to be matched for the object, and a <Shape Rotation> attribute that may identify a required angle of rotation and associated granularity values.

Using one or more of the features and approaches described above, users' experiences with various orientations can be improved. Although the description above provides illustrative examples and sequences of actions, it should be understood that the various examples and sequences may be rearranged, divided, combined and subcombined as desired. For example, steps and features described may be omitted, or additional steps and features may be added. Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim the following:

1. A method for controlling access to restricted content in a computing system, comprising the steps of:
    registering a security pattern on the computing system, wherein registering the security pattern includes:
        detecting a security object proximal the display of the computer system,
        detecting physical attributes of the security object including a physical shape of the security object, a physical pattern on the security object, a position of the security object in relation to the display, and an angular orientation of the security object in relation to the display,
        generating a list of the physical attributes of the security object in relation to the display,
        upon selection, displaying an attribute menu on the display, wherein the attribute menu displays selectable options that comprise the generated list of physical attributes for the security object that is proximal to the display of the computer system, wherein the selectable options are used to determine attributes of the security object to include in the security pattern;

receiving a user selection of one or more of the selectable options from the displayed attribute menu—wherein receiving user selection of the position of the security object includes receiving user specification of a position-based percentage margin of error and receiving user selection of the angular orientation of the security object includes receiving user specification of an angle-based percentage margin of error, generating the security pattern for granting access to the secured content based on the user selection from the attribute menu, and registering and storing the security pattern in association with security credentials for a user;

after registering and storing the security-pattern in association with security credentials for the user:

generating a prompt that requests security credentials, detecting an object proximal the display of the computing system, detecting physical attributes of the detected object in relation to the display, determining whether any of the detected physical attributes of the detected object matches the security pattern of the security object, when the detected physical attributes of the detected object matches the stored security pattern of the security object, providing the security credentials and causing the computer system to provide access to the restricted content, and when the detected physical attributes of the detected object do not match the stored security pattern of the security object, maintaining the restriction to the restricted content of the computer system.

2. The method of claim 1, further comprising a matching threshold, wherein determining whether any of the detected physical attributes of the detected object matches the stored security pattern of the security object includes matching according to the threshold.

3. The method of claim 1, further comprising, indicating that the detected object is the security object when any of the detected physical attributes of the detected object matches the stored security pattern of the security object.

4. The method of claim 1, further comprising, indicating that the detected object is not the security object when any of the detected physical attributes of the detected do not match the stored security pattern of the security object.

5. The method of claim 1, wherein at least one physical attribute of the physical attributes of the security object is a position of the security object in relation to the display, wherein the security object is different than the detected object.

6. A memory having computer executable instructions for controlling access to restricted content in a computing system, the instructions comprising:

registering a security pattern, wherein registering the security pattern includes:

detecting a security object proximal the display, detecting physical attributes of the security object including a physical shape of the security object, a physical pattern on the security object, a position of the security object in relation to the display, and an angular orientation of the security object in relation to the display, generating a list of the attributes of the security object in relation to the display, displaying an attribute menu on the display, wherein the attribute menu displays selectable options that comprise the generated list of attributes of the security object that is proximal to the display of the computer system, wherein the selectable options are used to determine attributes to include in the security pattern;

receiving a user selection of one or more of the selectable options from the displayed attribute menu;

generating the security pattern for granting access to the secured content based on the user selection from the attribute menu, and registering and storing the security pattern in association with security credentials for a user;

detecting an object proximal the display;

detecting attributes of the detected object in relation to the display;

determining whether any of the detected attributes of the detected object matches the stored security pattern of the security object;

when the detected attributes of the detected object matches the stored security pattern of the security object, providing security credentials for a user to access to the restricted content; and when the detected attributes of the detected object does not match the stored security pattern of the security object, maintaining the restriction to the restricted content.

7. The memory of claim 6, further comprising a matching threshold, wherein determining whether any of the detected attributes of the detected object matches the stored security pattern of the security object includes matching according to the threshold.

8. The memory of claim 6, further comprising, indicating that the detected object is the security object when any of the detected attributes of the detected object matches the stored security pattern of the security object.

9. The memory of claim 6, further comprising, indicating that the detected object is not the security object when any of the detected attributes of the detected object do not match the stored security pattern of the security object.

10. The memory of claim 6, wherein at least one attribute of the plurality of attributes of the security object is a position of the security object in relation to the display, wherein the security object is different than the detected object.

11. A system for controlling access to secured content in a computing system, the instructions comprising:

a processor; and a computer readable storage medium having computer executable instructions stored thereon, wherein the computer executable instructions are executed by the process and perform actions, comprising:

registering a security pattern, wherein registering the security pattern includes:

detecting a security object proximal the display, detecting physical attributes of the security object including a physical shape of the security object, a physical pattern on the security object, a position of the security object in relation to the display, and an angular orientation of the security object in relation to the display, generating a list of the attributes of the security object in relation to the display, displaying an attribute menu on the display, wherein the attribute menu displays selectable options that comprise the generated list of physical attributes for the security object that is proximal to the display, wherein the selectable options are used to determine attributes to include in the security pattern;

receiving a user selection of one or more of the selectable options from the displayed attribute menu, generating the security pattern for granting access to the secured content based on the user selection from the attribute menu, and registering and storing the security pattern in association with security credentials for a user;

detecting an object proximal the display;

detecting attributes of the detected object in relation to the display;

determining whether any of the detected attributes of the detected object matches the stored security pattern of the security object;

when the detected attributes of the detected object matches the stored security pattern of the security object, providing security credentials for a user to access to the restricted content; and when the detected attributes of the detected object does not match the stored security pattern of the security object, maintaining the restriction to the restricted content.

12. The system of claim 11, further comprising a matching threshold, wherein determining whether any of the detected attributes of the detected object matches the stored security pattern of the security object includes matching according to the threshold.

13. The system of claim 11, further comprising, indicating that the detected object is the security object when any of the detected attributes of the detected object matches the stored security pattern of the security object.

14. The system of claim 11, further comprising, indicating that the detected object is not the security object when any of the detected attributes of the detected object do not match the stored security pattern of the security object.

* * * * *